(12) United States Patent
Liu et al.

(10) Patent No.: US 11,089,559 B2
(45) Date of Patent: Aug. 10, 2021

(54) SYNCHRONIZATION PROCESSING METHOD AND APPARATUS, AND DEVICE

(71) Applicant: Huawei Technologies Co., Ltd., Shenzhen (CN)

(72) Inventors: Jin Liu, Shenzhen (CN); Lei Huang, Shanghai (CN); Xiaoyan Bi, Shanghai (CN); Huangping Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 209 days.

(21) Appl. No.: 16/256,204

(22) Filed: Jan. 24, 2019

(65) Prior Publication Data

US 2019/0159152 A1    May 23, 2019

Related U.S. Application Data

(63) Continuation of application No. PCT/CN2017/091235, filed on Jun. 30, 2017.

(30) Foreign Application Priority Data

Aug. 12, 2016  (CN) .......................... 201610670062.2

(51) Int. Cl.
*H04W 56/00*          (2009.01)
*H04W 72/02*          (2009.01)
(Continued)

(52) U.S. Cl.
CPC ....... *H04W 56/0015* (2013.01); *H04W 48/16* (2013.01); *H04W 56/00* (2013.01); *H04W 72/02* (2013.01); *H04W 72/046* (2013.01)

(58) Field of Classification Search
None
See application file for complete search history.

(56) References Cited

U.S. PATENT DOCUMENTS

2013/0148645 A1   6/2013  Hwang et al.
2016/0119958 A1   4/2016  Tan et al.
(Continued)

FOREIGN PATENT DOCUMENTS

CN    102932904 A    2/2013
CN    103582109 A    2/2014
(Continued)

OTHER PUBLICATIONS

"Universal Mobile Telecommunications System (UMTS); Synchronisation in UTRAN Stage 2 (3GPP TS 25.402 version 9.0.1 Release 9)," ETSI TS 125 402 V9.0.1, Apr. 2011, 53 pages.
(Continued)

*Primary Examiner* — Ayaz R Sheikh
*Assistant Examiner* — Sori A Aga
(74) *Attorney, Agent, or Firm* — Slater Matsil, LLP (57) ABSTRACT

A synchronization processing method, including sending, in a first time unit, by a network device, a first synchronization signal having one or more first beams to a terminal device, and sending, in a second time unit, a second synchronization signal having one or more second beams to the terminal device. The first synchronization signal and the second synchronization signal cause the terminal device to determine, according to the first synchronization signal and the second synchronization signal, an optimal transmit beam of the network device for the terminal device from the one or more first beam and the one or more second beams, and further to determine a time sequence in which the optimal transmit beam is located. A time offset corresponding to each first beam and second beams is different, and is a difference between a time sequence of the beams and a time sequence of the second beams.

20 Claims, 7 Drawing Sheets

(51) Int. Cl.
*H04W 48/16* (2009.01)
*H04W 72/04* (2009.01)

(56) References Cited

U.S. PATENT DOCUMENTS

2016/0360463 A1  12/2016  Kim
2016/0373180 A1  12/2016  Guo et al.

FOREIGN PATENT DOCUMENTS

| EP | 3370380 A1 | 9/2018 |
| WO | 2015080649 A1 | 6/2015 |
| WO | 2015090032 A1 | 6/2015 |
| WO | 2015093892 A1 | 6/2015 |

OTHER PUBLICATIONS

"Beam-Based Timing Mechanism for Multi-Beam Cases," Agenda Item: 7.1.2.1, Source: Spreadtrum Communications, Document for: Discussion and Decision, 3GPP TSG RAN WG1 Meeting #87, R1-1611479, Nov. 14-18, 2016, 4 pages.

SYNCHRONIZATION PROCESSING METHOD AND APPARATUS, AND DEVICE

CROSS-REFERENCE TO RELATED APPLICATIONS

This application is a continuation of International Application No. PCT/CN2017/091235, filed on Jun. 30, 2017, which claims priority to Chinese Patent Application No. 201610670062.2, filed on Aug. 12, 2016. The disclosures of the aforementioned applications are hereby incorporated by reference in their entireties.

TECHNICAL FIELD

Embodiments of this application relate to communications technologies, and in particular, to a synchronization processing method and apparatus, and a device.

BACKGROUND

Long Term Evolution Advanced (LTE-A), which is also referred to as 4G, is widely deployed and used. Compared with a 3G communications system, LTE-A enables a user to obtain a higher communication rate and better communication experience. Cell search and cell synchronization are key steps for user equipment (UE) in a mobile communications system to establish a connection to a communications network, and are mainly used to implement time-frequency synchronization between the UE and a base station of a cell in which the UE is located, so that the UE obtains a cell identity (ID), a system transmission parameter, and other cell broadcast information.

In an existing cell search and cell synchronization solution, synchronization signals (SS) usually include a primary synchronization signal (PSS) and a secondary synchronization signal (SSS). A PSS is usually used to enable UE to implement symbol synchronization and obtain a cell group ID, and an SSS is usually used to implement signal frame synchronization and obtain of a cell group ID. With research and development of a 5G communications system, a massive multiple-input multiple-output (MIMO) technology can effectively increase a system throughput. If the massive MIMO technology is combined with a millimeter wave, when a base station provides cell search and cell synchronization for UE within coverage of the base station, huge system resource overheads are caused. A user access solution in which polling is performed by using a plurality of narrow beams is currently provided. The base station divides the coverage into six sectors, each sector is divided into four slices, and each slice corresponds to one signal transmit beam direction of the base station. For each slice, the base station sends an SS for polling. The SS of each slice occupies one symbol. For a user within the coverage of the base station, a direction of a receive beam of the user is switched at an interval of one subframe (1 ms). To ensure that all beams sent by the base station are received, the base station inserts a synchronization channel (SCH) signal that is similar to a cyclic prefix into each receive beam interval (1 ms) of the user. For each subframe, a direction of an initial beam sent by the base station is changed in order. The UE performs correlation detection on a preset PSS sequence based on a PSS sequence that is sent by the base station, to implement symbol synchronization.

However, in a user access process, to enable the UE to distinguish different beams, a large quantity of SS sequences need to be introduced, thereby causing relatively high detection complexity during cell search and cell synchronization.

SUMMARY

Embodiments of this application provide a synchronization processing method and apparatus, and a device, to resolve the following problem. In a user access process, to enable UE to distinguish different beams, a large quantity of SS sequences need to be introduced, thereby causing relatively high detection complexity during cell search and cell synchronization.

According to a first aspect of this application, a synchronization processing method is provided, including sending, by a network device, a first synchronization signal to a terminal device in a first time unit, and sending a second synchronization signal to the terminal device in a second time unit, so that the terminal device determines, based on the first synchronization signal and the second synchronization signal, an optimal transmit beam of the network device for the terminal device and a time sequence in which the optimal transmit beam is located, where a time offset corresponding to each beam is different, and the time offset is a difference between a time sequence of the beam in the first synchronization signal and a time sequence of the beam in the second synchronization signal.

In this solution, the network device may be a network-side device such as a base station. An order of scanning beams in the first synchronization signal and an order of scanning beams in the second synchronization signal may be configured, as long as a terminal device at a receive end can distinguish a beam from other beams based on a time offset of the beam in the two synchronization signals. A sequence of a beam in the first synchronization signal may be the same as or different from a sequence of a beam in the second synchronization signal, and this is not specifically limited. In this solution, time offsets of beams in the two synchronization signals are different, and the terminal device at the receive end may determine, by simply detecting the two synchronization signals, the optimal transmit beam of the network device for the terminal device and the time sequence in which the optimal transmit beam is located. In this way, exchange needed between the terminal device and the network device to determine the optimal transmit beam is reduced, and complexity of synchronization detection to be performed by the terminal device is effectively reduced.

Optionally, each beam in the first synchronization signal uses a same sequence, and each beam in the second synchronization signal uses a same sequence.

To further reduce complexity of detection to be performed by the terminal device in a cell search and cell synchronization process, the network device uses a same sequence in all of the first synchronization signal to be sent, and also uses a same sequence in all of the second synchronization signal to be sent.

Optionally, the sequence in the first synchronization signal is the same as the sequence in the second synchronization signal.

Optionally, the sequence in the first synchronization signal is different from the sequence in the second synchronization signal.

Optionally, the sequence in the first synchronization signal and the sequence in the second synchronization signal are orthogonal to each other.

Preferably, the sequence in the first synchronization signal and the sequence in the second synchronization signal are conjugate to each other.

Optionally, an order of scanning beams in the first synchronization signal and an order of scanning beams in the second synchronization signal are mutually reversed.

In this solution, the order of scanning beams in the first synchronization signal and the order of scanning beams in the second synchronization signal are reversed. In this way, the terminal device at the receive end can perform locating based on a difference between receiving time of beams, and can determine a beam at another location after determining one of the beams, so that a time sequence of an uplink access channel is in a one-to-one correspondence with a time sequence of a downlink access channel, and beam-related information exchange between the terminal device and the network device is reduced.

Based on any one of the foregoing solutions, the method further includes receiving, by the network device, a signal that is sent in the time sequence in which the optimal transmit beam is located by the terminal device.

After the optimal transmit beam of the network device for the terminal device is determined, based on uplink and downlink reciprocity, a time sequence location of the optimal transmit beam is also an optimal location at which the terminal device sends an uplink beam. Therefore, the terminal device may send an uplink signal to the network device in the time sequence in which the optimal transmit beam is located.

According to a second aspect of this application, a synchronization processing method is provided, including receiving, by a terminal device, a first synchronization signal sent in a first time unit by a network device and a second synchronization signal sent in a second time unit by the network device, where a time offset corresponding to each beam is different, and the time offset is a difference between a time sequence of the beam in the first synchronization signal and a time sequence of the beam in the second synchronization signal, and determining, by the terminal device based on the first synchronization signal and the second synchronization signal, an optimal transmit beam of the network device for the terminal device and a time sequence in which the optimal transmit beam is located.

In this solution, the terminal device receives the first synchronization signal and the second synchronization signal sent by the network device, and a time offset of each beam in the two synchronization signals is different from a time offset of another beam in the two synchronization signals. The terminal device performs correlation detection on a sequence of a received beam, and determines a time sequence location of a most correlated beam based on the time offset. In other words, a plurality of synchronization signals are not needed, to determine the optimal transmit beam and the time sequence in which the optimal transmit beam is located, but the optimal transmit beam can be obtained as long as the two synchronization signals are detected. In this way, synchronization signal exchange between the terminal device and the network device is reduced, and detection complexity of a synchronization process is reduced.

Optionally, the determining, by the terminal device based on the first synchronization signal and the second synchronization signal, an optimal transmit beam of the network device for the terminal device and a time sequence in which the optimal transmit beam is located includes performing, by the terminal device, correlation detection on a sequence of each beam in the first synchronization signal and a sequence of each beam in the second synchronization signal, to obtain an optimal beam having a highest correlation in the first synchronization signal and an optimal beam having a highest correlation in the second synchronization signal, and obtaining, by the terminal device based on a time difference between the optimal beam having the highest correlation in the first synchronization signal and the optimal beam having the highest correlation in the second synchronization signal, the optimal transmit beam of the network device for the terminal device and the time sequence in which the optimal transmit beam is located.

Based on any one of the foregoing solutions, the method further includes initiating, by the terminal device, random access based on a time sequence correspondence between the optimal transmit beam and a random access channel.

Optionally, the method further includes sending, by the terminal device, a signal to the network device in the time sequence in which the optimal transmit beam is located.

After the optimal transmit beam of the network device for the terminal device is determined, based on uplink and downlink reciprocity, a time sequence location of the optimal transmit beam is also an optimal location at which the terminal device sends an uplink beam. Therefore, the terminal device may send an uplink signal to the network device in the time sequence in which the optimal transmit beam is located.

Optionally, each beam in the first synchronization signal uses a same sequence, and each beam in the second synchronization signal uses a same sequence.

Optionally, the sequence in the first synchronization signal is the same as the sequence in the second synchronization signal.

Optionally, the sequence in the first synchronization signal is different from the sequence in the second synchronization signal.

Optionally, the sequence in the first synchronization signal and the sequence in the second synchronization signal are orthogonal to each other.

Optionally, the sequence in the first synchronization signal and the sequence in the second synchronization signal are conjugate to each other.

Optionally, an order of scanning beams in the first synchronization signal and an order of scanning beams in the second synchronization signal are mutually reversed.

According to a third aspect of this application, a synchronization processing apparatus is provided, including a processing module, configured to generate a first synchronization signal and a second synchronization signal, and a sending module, configured to send the first synchronization signal to a terminal device in a first time unit, and send the second synchronization signal to the terminal device in a second time unit, so that the terminal device determines, based on the first synchronization signal and the second synchronization signal, an optimal transmit beam of the synchronization processing apparatus for the terminal device and a time sequence in which the optimal transmit beam is located, where a time offset corresponding to each beam is different, and the time offset is a difference between a time sequence of the beam in the first synchronization signal and a time sequence of the beam in the second synchronization signal.

Optionally, each beam in the first synchronization signal uses a same sequence, and each beam in the second synchronization signal uses a same sequence.

Optionally, the sequence in the first synchronization signal is the same as the sequence in the second synchronization signal.

Optionally, the sequence in the first synchronization signal is different from the sequence in the second synchronization signal.

Optionally, the sequence in the first synchronization signal and the sequence in the second synchronization signal are orthogonal to each other.

Optionally, the sequence in the first synchronization signal and the sequence in the second synchronization signal are conjugate to each other.

Optionally, an order of scanning beams in the first synchronization signal and an order of scanning beams in the second synchronization signal are mutually reversed.

Optionally, the apparatus further includes a receiving module, configured to receive a signal that is sent in the time sequence in which the optimal transmit beam is located by the terminal device.

According to a fourth aspect of this application, a synchronization processing apparatus is provided, including a receiving module, configured to receive a first synchronization signal sent in a first time unit by a network device and a second synchronization signal sent in a second time unit by the network device, where a time offset corresponding to each beam is different, and the time offset is a difference between a time sequence of the beam in the first synchronization signal and a time sequence of the beam in the second synchronization signal, and a processing module, configured to determine, based on the first synchronization signal and the second synchronization signal, an optimal transmit beam of the network device for the synchronization processing apparatus and a time sequence in which the optimal transmit beam is located.

Optionally, the processing module is specifically configured to perform correlation detection on a sequence of each beam in the first synchronization signal and a sequence of each beam in the second synchronization signal, to obtain an optimal beam having a highest correlation in the first synchronization signal and an optimal beam having a highest correlation in the second synchronization signal, and obtain, based on a time difference between the optimal beam having the highest correlation in the first synchronization signal and the optimal beam having the highest correlation in the second synchronization signal, the optimal transmit beam of the network device for the synchronization processing apparatus and the time sequence in which the optimal transmit beam is located.

Optionally, the processing module is further configured to initiate random access based on a time sequence correspondence between the optimal transmit beam and a random access channel.

Optionally, the apparatus further includes a sending module, configured to send a signal to the network device in the time sequence in which the optimal transmit beam is located.

Optionally, each beam in the first synchronization signal uses a same sequence, and each beam in the second synchronization signal uses a same sequence.

Optionally, the sequence in the first synchronization signal is the same as the sequence in the second synchronization signal.

Optionally, the sequence in the first synchronization signal is different from the sequence in the second synchronization signal.

Optionally, the sequence in the first synchronization signal and the sequence in the second synchronization signal are orthogonal to each other.

Optionally, the sequence in the first synchronization signal and the sequence in the second synchronization signal are conjugate to each other.

Optionally, an order of scanning beams in the first synchronization signal and an order of scanning beams in the second synchronization signal are mutually reversed.

According to a fifth aspect of this application, a network device is provided, including a processor, configured to generate a first synchronization signal and a second synchronization signal, and a transmitter, configured to send the first synchronization signal to a terminal device in a first time unit, and send the second synchronization signal to the terminal device in a second time unit, so that the terminal device determines, based on the first synchronization signal and the second synchronization signal, an optimal transmit beam of the network device for the terminal device and a time sequence in which the optimal transmit beam is located, where a time offset corresponding to each beam is different, and the time offset is a difference between a time sequence of the beam in the first synchronization signal and a time sequence of the beam in the second synchronization signal.

Optionally, each beam in the first synchronization signal uses a same sequence, and each beam in the second synchronization signal uses a same sequence.

Optionally, the sequence in the first synchronization signal is the same as the sequence in the second synchronization signal.

Optionally, the sequence in the first synchronization signal is different from the sequence in the second synchronization signal.

Optionally, the sequence in the first synchronization signal and the sequence in the second synchronization signal are orthogonal to each other.

Optionally, the sequence in the first synchronization signal and the sequence in the second synchronization signal are conjugate to each other.

Optionally, an order of scanning beams in the first synchronization signal and an order of scanning beams in the second synchronization signal are mutually reversed.

Optionally, the network device further includes a receiver, configured to receive a signal that is sent in the time sequence in which the optimal transmit beam is located by the terminal device.

According to a sixth aspect of this application, a terminal device is provided, including a receiver, configured to receive a first synchronization signal sent in a first time unit by a network device and a second synchronization signal sent in a second time unit by the network device, where a time offset corresponding to each beam is different, and the time offset is a difference between a time sequence of the beam in the first synchronization signal and a time sequence of the beam in the second synchronization signal, and a processor, configured to determine, based on the first synchronization signal and the second synchronization signal, an optimal transmit beam of the network device for the terminal device and a time sequence in which the optimal transmit beam is located.

Optionally, the processor is specifically configured to perform correlation detection on a sequence of each beam in the first synchronization signal and a sequence of each beam in the second synchronization signal, to obtain an optimal beam having a highest correlation in the first synchronization signal and an optimal beam having a highest correlation in the second synchronization signal, and obtain, based on a time difference between the optimal beam having the highest correlation in the first synchronization signal and the optimal beam having the highest correlation in the second synchronization signal, the optimal transmit beam of the network device for the terminal device and the time sequence in which the optimal transmit beam is located.

Optionally, the processor is further configured to initiate random access based on a time sequence correspondence between the optimal transmit beam and a random access channel.

Optionally, the terminal device further includes a transmitter, configured to send a signal to the network device in the time sequence in which the optimal transmit beam is located.

Optionally, each beam in the first synchronization signal uses a same sequence, and each beam in the second synchronization signal uses a same sequence.

Optionally, the sequence in the first synchronization signal is the same as the sequence in the second synchronization signal.

Optionally, the sequence in the first synchronization signal is different from the sequence in the second synchronization signal.

Optionally, the sequence in the first synchronization signal and the sequence in the second synchronization signal are orthogonal to each other.

Optionally, the sequence in the first synchronization signal and the sequence in the second synchronization signal are conjugate to each other.

Optionally, an order of scanning beams in the first synchronization signal and an order of scanning beams in the second synchronization signal are mutually reversed.

In specific implementation of the network device or the terminal device, a computer program and a memory may be further included. The computer program is stored in the memory, and the processor runs the computer program to perform the foregoing synchronization processing method. There is at least one processor, and the at least one processor is configured to perform an execution instruction, that is, the computer program, stored in the memory, so that the terminal device performs data exchange with the network device by using a communications interface, to perform the synchronization processing method provided in the implementations of the foregoing aspects. Optionally, the memory may be further integrated in the processor.

According to a seventh aspect of this application, a storage medium is provided, including a readable storage medium and a computer program, where the computer program is configured to perform the synchronization processing method provided in any one of the first aspect or the implementations of the first aspect.

According to an eighth aspect of this application, a storage medium is provided, including a readable storage medium and a computer program, where the computer program is configured to perform the synchronization processing method provided in any one of the second aspect or the implementations of the second aspect.

According to a ninth aspect of this application, a program product is provided, where the program product includes a computer program (an execution instruction), and the computer program is stored in a readable storage medium. At least one processor of a network device may read the computer program from the readable storage medium, and the at least one processor performs the computer program, so that the network device performs the synchronization processing method provided in the implementations of the first aspect.

According to a tenth aspect of this application, a program product is provided, where the program product includes a computer program (an execution instruction), and the computer program is stored in a readable storage medium. At least one processor of a terminal device may read the computer program from the readable storage medium, and the at least one processor performs the computer program, so that the terminal device performs the synchronization processing method provided in the implementations of the second aspect.

In the synchronization processing method and apparatus, and the device provided in this application, the network device sends the first synchronization signal to the terminal device in the first time unit and sends the second synchronization signal to the terminal device in the second time unit, where the time offset corresponding to each beam is different, and the terminal device determines, based on the first synchronization signal and the second synchronization signal, the optimal transmit beam of the network device for the terminal device and the time sequence in which the optimal transmit beam is located. Time offsets of beams in the two synchronization signals are different, and the terminal device at the receive end may determine, by simply detecting the two synchronization signals, the optimal transmit beam of the network device for the terminal device and the time sequence in which the optimal transmit beam is located. In this way, exchange needed between the terminal device and the network device to determine the optimal transmit beam is reduced, and complexity of synchronization detection to be performed by the terminal device is effectively reduced.

DETAILED DESCRIPTION OF ILLUSTRATIVE EMBODIMENTS

This application provides a new user access solution to overcome the following problems. During synchronization processing, for a terminal device to determine a time sequence in which an optimal transmit beam of a network device for the terminal device is located, signals of a plurality of subframes need to be detected, with relatively much signaling exchange and high detection complexity. In this solution, a user-side terminal device may determine an optimal beam simply based on two synchronization signals with specified regularity after the network device sends the two synchronization signals, thereby reducing complexity of detection to be performed by a user in a cell search and cell synchronization process.

Figure 1:
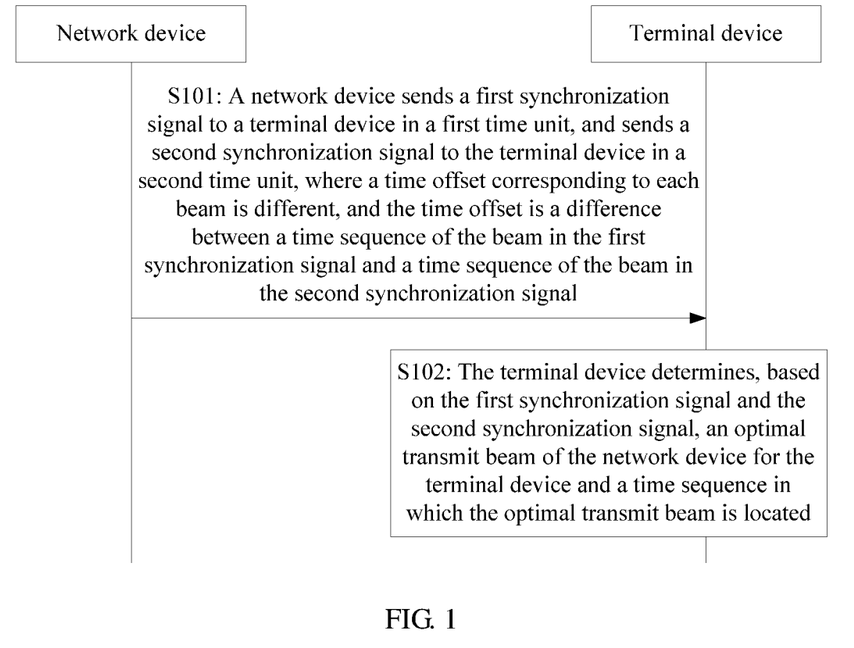
FIG. 1 is a flowchart of a synchronization processing method according to Embodiment 1 of this application.

FIG. 1 is a flowchart of a synchronization processing method according to Embodiment 1 of this application. As shown in FIG. 1, specific implementation steps of the synchronization processing method are as follows.

S101: A network device sends a first synchronization signal to a terminal device in a first time unit, and sends a second synchronization signal to the terminal device in a second time unit, where a time offset corresponding to each beam is different, and the time offset is a difference between a time sequence of the beam in the first synchronization signal and a time sequence of the beam in the second synchronization signal.

In this step, the network device is a network-side base station, or another device that can provide a base station function, and the terminal device is a user-side device that needs to perform uplink and downlink data exchange, such as a mobile phone or a tablet computer. Particularly, in device-to-device (D2D) communication, the network device may be a device serving as a base station function.

The network device needs to generate two synchronization signals, and a time offset of each beam in the two synchronization signals is different. For example, an offset between a time sequence of a first beam in the first synchronization signal and a time sequence of the first beam in the second synchronization signal is t1, an offset between a time sequence of a second beam in the first synchronization signal and a time sequence of the second beam in the second synchronization signal is t2, and an offset between a time sequence of a third beam in the first synchronization signal and a time sequence of the third beam in the second synchronization signal is t3. Any two of t1, t2, and t3 herein are different from each other. The network device may send the first synchronization signal and the second synchronization signal to the terminal device at different time sequence locations in a same signal frame.

S102: The terminal device determines, based on the first synchronization signal and the second synchronization signal, an optimal transmit beam of the network device for the terminal device and a time sequence in which the optimal transmit beam is located.

In this step, the terminal device receives the first synchronization signal sent in the first time unit by the network device and the second synchronization signal sent in the second time unit by the network device. Because the time offset corresponding to each beam is different, the terminal device performs correlation detection on beams in each synchronization signal, determines the time offset of each beam in the first synchronization signal and in the second synchronization signal, and then can locate time sequences of different beams based on the time offset, and determines, based on a result of the correlation detection, a most correlated beam, that is, the optimal transmit beam of the network device for the terminal device, and the time sequence in which the most correlated beam is located.

Further, the terminal device initiates random access based on a time sequence correspondence between the optimal transmit beam and a random access channel, to implement access and synchronization of the terminal device.

Optionally, after determining the optimal transmit beam of the network device for the terminal device, the terminal device may determine, based on uplink and downlink reciprocity, that the time sequence in which the optimal transmit beam is located is also an optimal transmit beam for the terminal device to send an uplink signal. Accordingly, the terminal device may send a signal to the network device in the time sequence in which the optimal transmit beam is located.

In the synchronization processing method provided in this embodiment, time offsets of beams in the two synchronization signals are different, and a terminal device at a receive end may determine, by simply detecting the two synchronization signals, the optimal transmit beam of the network device for the terminal device and the time sequence in which the optimal transmit beam is located. In this way, exchange needed between the terminal device and the network device to determine the optimal transmit beam is reduced, and complexity of synchronization detection to be performed by the terminal device is effectively reduced.

Figure 2:
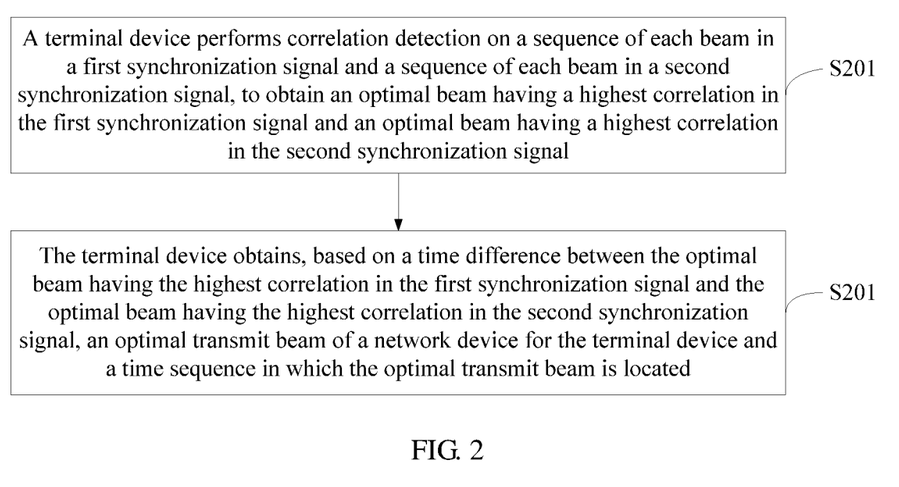
FIG. 2 is a flowchart of a synchronization processing method according to Embodiment 2 of this application.

FIG. 2 is a flowchart of a synchronization processing method according to Embodiment 2 of this application. As shown in FIG. 2, based on the foregoing Embodiment 1, specific implementation steps of step S102 in which the terminal device determines, based on the first synchronization signal and the second synchronization signal, an optimal transmit beam of the network device for the terminal device and a time sequence in which the optimal transmit beam is located are as follows.

S201: The terminal device performs correlation detection on a sequence of each beam in the first synchronization signal and a sequence of each beam in the second synchronization signal, to obtain an optimal beam having a highest correlation in the first synchronization signal and an optimal beam having a highest correlation in the second synchronization signal.

In this step, in a process of receiving each synchronization signal, the terminal device sequentially performs correlation detection on sequences corresponding to different beams in each synchronization signal, to find, for the sequences of the beams in the synchronization signal, a beam having an optimal correlation, that is, the optimal beam.

S202: The terminal device obtains, based on a time difference between the optimal beam having the highest correlation in the first synchronization signal and the optimal beam having the highest correlation in the second synchronization signal, the optimal transmit beam of the network device for the terminal device and the time sequence in which the optimal transmit beam is located.

In this step, the terminal device determines the time difference between the optimal beam in the first synchronization signal and the optimal beam in the second synchronization signal. In other words, the terminal device determines, based on the time difference between the beams in the two synchronization signals, a time sequence location corresponding to the optimal transmit beam of the network device for the terminal device, and may obtain an identifier of the optimal transmit beam, to implement symbol locating.

In the foregoing two embodiments, to further reduce complexity of detection to be performed by the terminal device in a cell search and cell synchronization process, the network device uses a same sequence in the first synchronization signal to be sent, and also uses a same sequence in the second synchronization signal to be sent. In other words, each beam in the first synchronization signal uses a same sequence, and each beam in the second synchronization signal uses a same sequence. The sequence in the first synchronization signal may be the same as or different from the sequence in the second synchronization signal.

Preferably, the sequence in the first synchronization signal and the sequence in the second synchronization signal are orthogonal to each other. For example, the sequence in the first synchronization signal and the sequence in the second synchronization signal are conjugate to each other.

In specific implementation, an order of scanning beams in the first synchronization signal and an order of scanning beams in the second synchronization signal are mutually reversed.

With reference to the foregoing embodiments, the synchronization processing method provided in this application is described below in detail by using an example in which the network device is a base station, and the synchronization signals are PSSs.

This solution provides a user access solution applied to a high-frequency system. A base station sends synchronization signals in only two subframes (the foregoing time units) in one downlink signal frame (10 ms). A PSS sequence used by each beam in the two subframes is the same, thereby reducing complexity of detection to be performed by UE in a cell search and cell synchronization process. In the two subframes in which the PSSs are sent in the signal frame, orders of scanning transmit beams of the base station are mutually reversed. In this way, the UE may perform symbol timing (symbol timing) based on a difference between receiving time of beams, so that a time sequence of an uplink access channel is in a one-to-one correspondence with a time sequence of a downlink access channel, thereby reducing information exchange, related to beam synchronization, between the UE and the base station.

Figure 3:
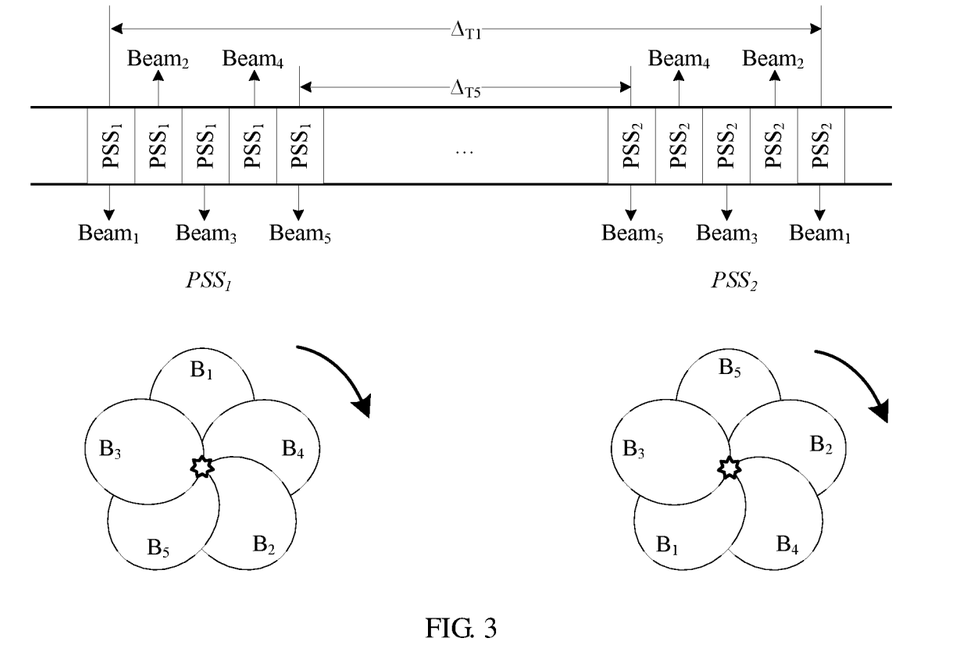
FIG. 3 is a schematic diagram of a design of a synchronization signal frame according to this application.
Figure 4:
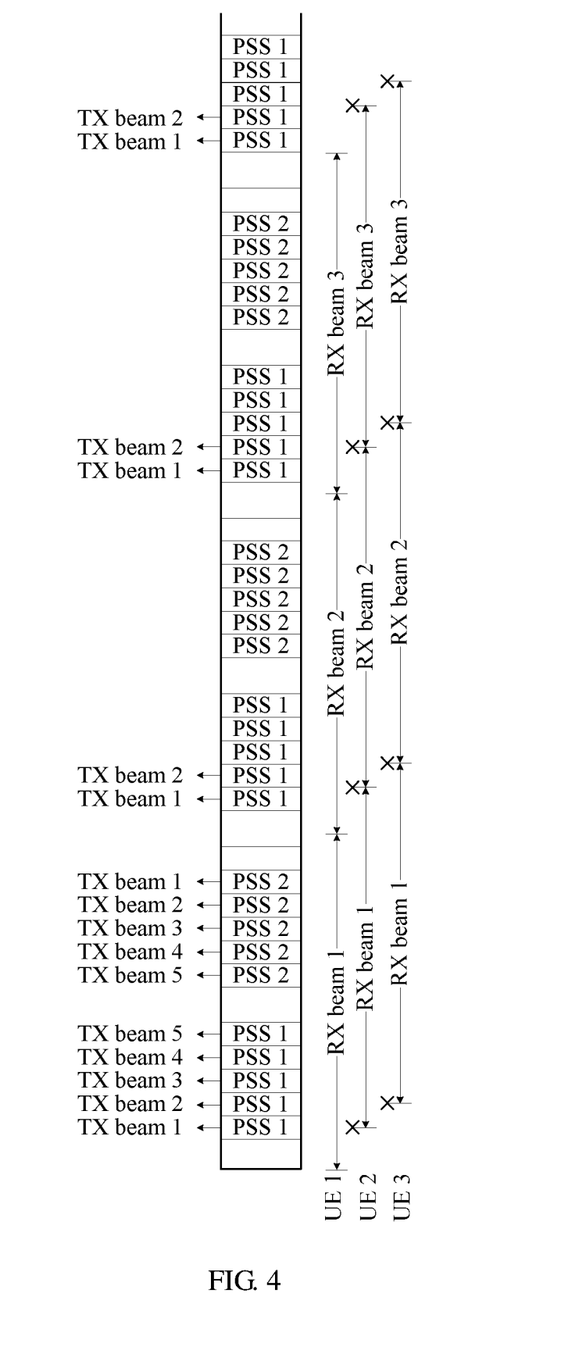
FIG. 4 is a schematic diagram of performing synchronization signal detection by UE according to this application.

FIG. 3 is a schematic diagram of a design of a synchronization signal frame according to this application. FIG. 4 is a schematic diagram of performing synchronization signal detection by UE according to this application. As shown in FIG. 3, a beam 1 (B1), a beam 2 (B2), a beam 3 (B3), a beam 4 (B4), and a beam 5 (B5) in FIG. 3 indicate identifiers of different beams, a PSS 1 indicates the first synchronization signal and a sequence in a beam, and a PSS 2 indicates the second synchronization signal and a sequence in a beam. It can be seen from FIG. 3 that all sequences in the first synchronization signal are the same, and all sequences in the second synchronization signal are the same. $\Delta_{T1}$ indicates a time offset between the beam 1 in the first synchronization signal and the beam 1 in the second synchronization signal, and $\Delta_{T5}$ indicates a time offset between the beam 5 in the first synchronization signal and the beam 5 in the second synchronization signal.

For different signal slices (the foregoing different beams) of each subframe, all PSS sequences used in a synchronization signal to be sent by the base station are the same. One signal frame uses only two PSS sequences. Preferably, the PSS sequences in the two synchronization signals are conjugate to each other. Orders of scanning beams in two adjacent subframes are mutually reversed.

As shown in FIG. 4, the base station sends the PSS 1 and the PSS 2 in different signal frames (time units). UE 1, UE 2, and UE 3 separately receive the synchronization signals sent by the base station. Each UE detects the synchronization signals by switching a receive beam. Access time of the UE is not limited, because the UE may receive, within a time interval of a receive beam, all beams sent in a signal frame by the base station. For different beams in each subframe, the UE performs correlation detection on received PSS sequences, to find a beam, corresponding to an optimal result of the correlation detection that is performed on the PSS sequences, in the subframe. The UE determines, based on a time difference between the beams found in the two subframes, a time sequence location corresponding to an optimal transmit beam of the base station, and obtains an identifier of the optimal transmit beam of the base station, to implement symbol timing.

As described above, the UE may obtain a direction of the optimal transmit beam of the base station by receiving a downlink synchronization signal, and the UE may send an uplink beam in the direction of the optimal transmit beam of the base station based on uplink and downlink reciprocity. In the example in FIG. 4, the UE may perform detection by using a plurality of downlink synchronization signal frames, switch, for each signal frame, a direction of a receive beam of the UE, and compare correlation detection results of PSS sequences in each signal frame. A direction of a receive beam, corresponding to an optimal detection result, of the UE is a direction of an optimal receive beam of the UE.

As shown in FIG. 4, first beams initially received by different UE may be different, but for a same receive beam, the foregoing processing may be performed upon reception of all beams of one synchronization signal, to obtain the optimal transmit beam.

Figure 5:
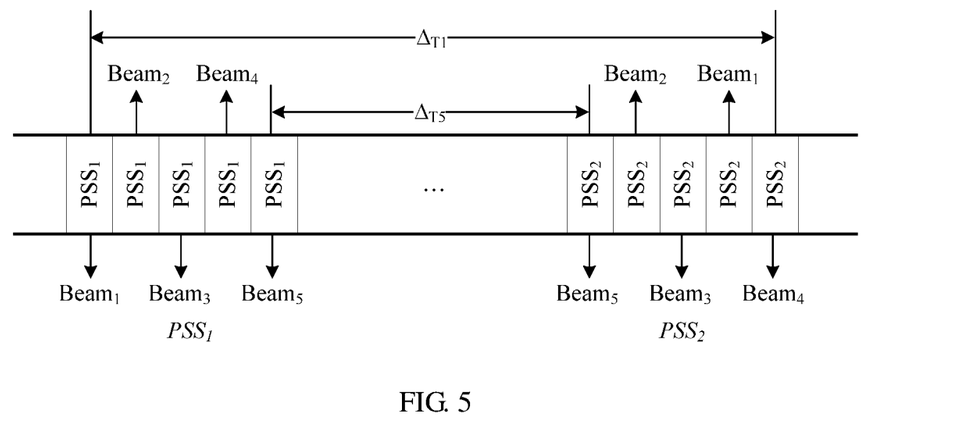
FIG. 5 is a schematic diagram of orders of scanning beams in two synchronization signals according to this application.

In the foregoing implementation, in the subframes in which the synchronization signals are sent in the signal frame, the orders of scanning beams may be configured, and are not necessarily reversed mutually. There may be another scanning order, as long as a receive end can distinguish, based on the time difference between the optimal beams in the two adjacent subframes, a time sequence location corresponding to the optimal transmit beam. FIG. 5 is a schematic diagram of orders of scanning beams in two synchronization signals according to this application. FIG. 5 shows a manner in which orders of scanning beams in two adjacent subframes (the first synchronization signal and the second synchronization signal) are mutually reversed.

Figure 6:
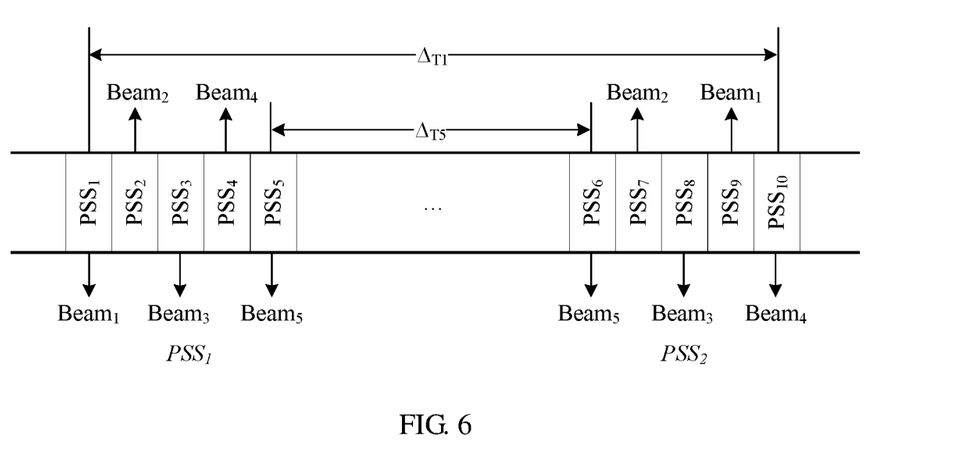
FIG. 6 is a schematic diagram of two synchronization signals using totally different sequences according to this application.

The foregoing shows a case in which all sequences in a same synchronization signal are the same. During actual implementation, in the synchronization signals sent in the two adjacent subframes that use the PSS sequences in the signal frame, all or some of PSS sequences used by each beam may be the same, or all PSS sequences used by each beam may be different. FIG. 6 is a schematic diagram of two synchronization signals using totally different sequences according to this application. As shown in FIG. 6, sequences used by a beam 1, a beam 2, a beam 3, a beam 4, and a beam 5 in a first synchronization signal PSS 1 are all different, sequences used by a beam 1, a beam 2, a beam 3, a beam 4, and a beam 5 in a second synchronization signal PSS 2 are also all different, and the sequences in the two synchronization signals are different from one another, as long as a time offset of a beam in the two synchronization signals is different from time offsets of other beams in the two synchronization signals.

Figure 7:
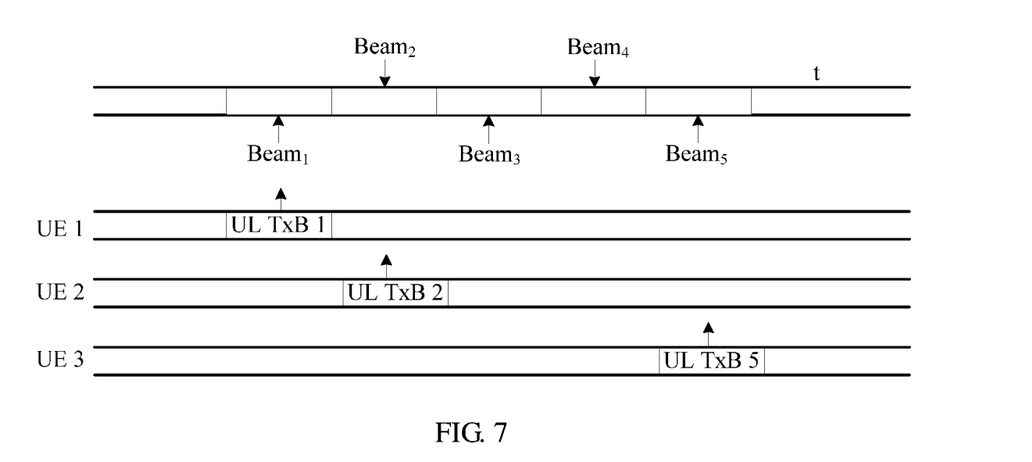
FIG. 7 is a schematic diagram of an access slot of a terminal device according to this application.

FIG. 7 is a schematic diagram of an access slot of a terminal device according to this application. In a solution of this application, in a signal synchronization process, UE may obtain a direction of an optimal transmit beam of a base station and a time sequence location that corresponds to the optimal transmit beam, and may simultaneously obtain a direction of an optimal receive beam of the UE. The UE may send, in a time sequence corresponding to the optimal transmit beam of the base station, an uplink beam in a receiving direction of the optimal receive beam. In this solution, a time sequence of an uplink access channel can correspond to a time sequence of a downlink access channel.

As shown in FIG. 7, a time sequence of an uplink access channel corresponds to a time sequence of a downlink access channel. The base station switches, in an order of switching a transmit beam in a signal synchronization process, a direction of a receive beam. The UE sends, only in a slot corresponding to the optimal transmit beam of the base station in the signal synchronization process, a preamble sequence (a UL TxB1, a UL TxB2, or a UL TxB5) in the direction of the optimal receive beam, to further perform a user access process. For example, an optimal transmit beam of UE 1 shown in FIG. 7 is a beam 1, an optimal transmit beam of UE 2 is a beam 2, and an optimal transmit beam of UE 3 is a beam 5. Therefore, each UE may send an uplink preamble sequence at a time sequence location (the UL TxB1, the UL TxB2, or the UL TxB5) corresponding to the optimal transmit beam of each UE, to complete an access process.

A mapping relationship between a synchronization channel resource and an access channel resource may be pre-defined, or may be flexibly configured by using a broadcast channel or higher layer signaling. In the foregoing embodiments, in the user access process, a channel resource on a base station side is in a one-to-one correspondence with a resource of a first synchronization channel in a synchronization process, but the one-to-one correspondence is not mandatory. The mapping relationship between the channel resource on the base station side and the resource of the first synchronization channel may be configured, and is then notified to a user by using a broadcast channel or higher layer signaling, so that the user sends a preamble sequence based on a notified time domain location.

In the foregoing technical solution, the synchronization processing method in this application is described by using an example in which only a PSS is used as a synchronization signal in this solution. This application is not limited to use of the PSS herein, and configuration may be specifically performed as necessary.

In the synchronization processing method provided in this application, the access signal is sent by using wide beams and a power boosting method (that is, sending is performed in an optimal transmit direction), and the time sequences of the beams are identified by using different receive beam slots in one synchronization signal, so that a time sequence of a transmit beam corresponds to a time sequence of a receive beam, and a time sequence for sending a beam implicitly includes an identifier of the beam. In this way, required synchronization sequences are reduced, and synchronization detection complexity is greatly reduced. A one-to-one correspondence between a plurality of uplink access channels and a plurality of downlink access channels is implemented by using this solution. A user-side terminal device needs to send a preamble sequence only on a corresponding physical random access channel (PRACH), thereby avoiding excessive beam identifier information exchange between a network device and the terminal device.

The synchronization processing and access solution provided in this application may be popularized to a plurality of user access scenarios, to reduce information exchange between a network side and a user side in an access process.

Figure 8:
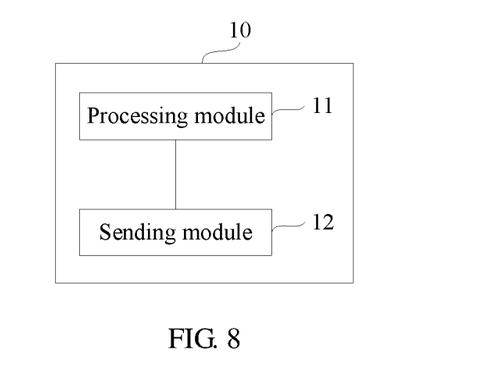
FIG. 8 is a schematic structural diagram of a synchronization processing apparatus according to Embodiment 1 of this application.

FIG. 8 is a schematic structural diagram of a synchronization processing apparatus according to Embodiment 1 of this application. The synchronization processing apparatus 10 includes a processing module 11, configured to generate a first synchronization signal and a second synchronization signal, and a sending module 12, configured to send the first synchronization signal to a terminal device in a first time unit, and send the second synchronization signal to the terminal device in a second time unit, so that the terminal device determines, based on the first synchronization signal and the second synchronization signal, an optimal transmit beam of the synchronization processing apparatus for the terminal device and a time sequence in which the optimal transmit beam is located, where a time offset corresponding to each beam is different, and the time offset is a difference between a time sequence of the beam in the first synchronization signal and a time sequence of the beam in the second synchronization signal.

The synchronization processing apparatus provided in this embodiment is configured to perform the technical solution on a network device side in any one of the foregoing method embodiments. An implementation principle and a technical effect of this embodiment are similar to those of the method embodiment, and details are not described herein again.

Based on the foregoing embodiment, optionally, each beam in the first synchronization signal uses a same sequence, and each beam in the second synchronization signal uses a same sequence.

Optionally, the sequence in the first synchronization signal is the same as the sequence in the second synchronization signal.

Optionally, the sequence in the first synchronization signal is different from the sequence in the second synchronization signal.

Optionally, the sequence in the first synchronization signal and the sequence in the second synchronization signal are orthogonal to each other.

Preferably, the sequence in the first synchronization signal and the sequence in the second synchronization signal are conjugate to each other.

Optionally, an order of scanning beams in the first synchronization signal and an order of scanning beams in the second synchronization signal are mutually reversed.

Figure 9:
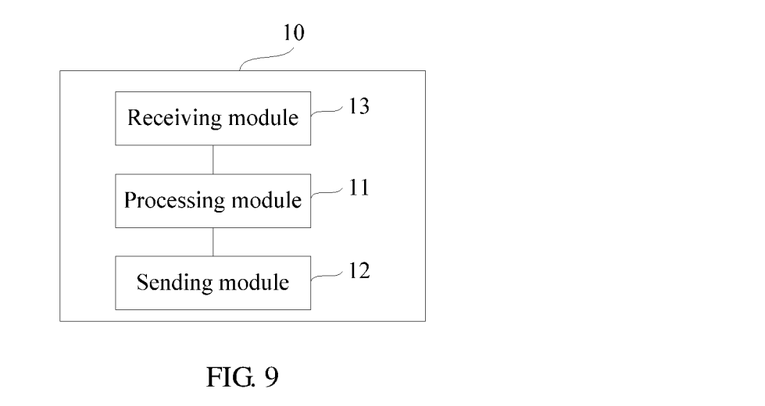
FIG. 9 is a schematic structural diagram of a synchronization processing apparatus according to Embodiment 2 of this application.

FIG. 9 is a schematic structural diagram of a synchronization processing apparatus according to Embodiment 2 of this application. Based on the foregoing embodiment, the synchronization processing apparatus 10 further includes a receiving module 13, configured to receive a signal that is sent in the time sequence in which the optimal transmit beam is located by the terminal device.

The synchronization processing apparatus provided in this embodiment is configured to perform the technical solution on a network device side in any one of the foregoing method embodiments. An implementation principle and a technical effect of this embodiment are similar to those of the method embodiment, and details are not described herein again.

Figure 10:
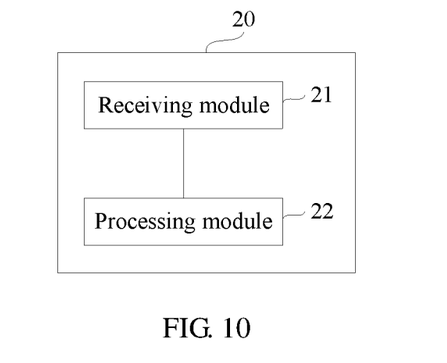
FIG. 10 is a schematic structural diagram of a synchronization processing apparatus according to Embodiment 3 of this application.

FIG. 10 is a schematic structural diagram of a synchronization processing apparatus according to Embodiment 3 of this application. As shown in FIG. 10, the synchronization processing apparatus 20 includes a receiving module 21, configured to receive a first synchronization signal sent in a first time unit by a network device and a second synchronization signal sent in a second time unit by the network device, where a time offset corresponding to each beam is different, and the time offset is a difference between a time sequence of the beam in the first synchronization signal and a time sequence of the beam in the second synchronization signal, and a processing module 22, configured to determine, based on the first synchronization signal and the second synchronization signal, an optimal transmit beam of the network device for the synchronization processing apparatus and a time sequence in which the optimal transmit beam is located.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The synchronization processing apparatus provided in this embodiment is configured to perform the technical solution on a terminal device side in any one of the foregoing method embodiments. An implementation principle and a technical effect of this embodiment are similar to those of the method embodiment, and details are not described herein again.

Based on the foregoing Embodiment 3, the processing module 22 is specifically configured to perform correlation detection on a sequence of each beam in the first synchronization signal and a sequence of each beam in the second synchronization signal, to obtain an optimal beam having a highest correlation in the first synchronization signal and an optimal beam having a highest correlation in the second synchronization signal, and obtain, based on a time difference between the optimal beam having the highest correlation in the first synchronization signal and the optimal beam having the highest correlation in the second synchronization signal, the optimal transmit beam of the network device for the synchronization processing apparatus and the time sequence in which the optimal transmit beam is located.

Optionally, the processing module 22 is further configured to initiate random access based on a time sequence correspondence between the optimal transmit beam and a random access channel.

Figure 11:
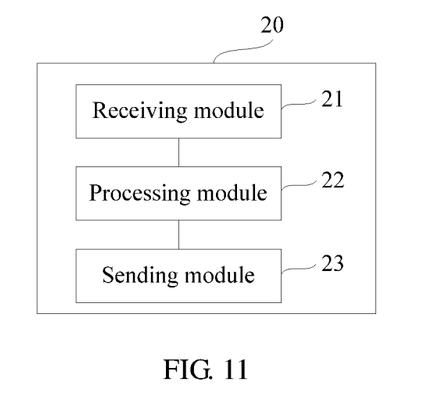
FIG. 11 is a schematic structural diagram of a synchronization processing apparatus according to Embodiment 4 of this application.

FIG. 11 is a schematic structural diagram of a synchronization processing apparatus according to Embodiment 4 of this application. The synchronization processing apparatus 20 further includes a sending module 23, configured to send a signal to the network device in the time sequence in which the optimal transmit beam is located.

Optionally, each beam in the first synchronization signal uses a same sequence, and each beam in the second synchronization signal uses a same sequence.

Optionally, the sequence in the first synchronization signal is the same as the sequence in the second synchronization signal.

Optionally, the sequence in the first synchronization signal is different from the sequence in the second synchronization signal.

Optionally, the sequence in the first synchronization signal and the sequence in the second synchronization signal are orthogonal to each other.

Preferably, the sequence in the first synchronization signal and the sequence in the second synchronization signal are conjugate to each other.

Optionally, an order of scanning beams in the first synchronization signal and an order of scanning beams in the second synchronization signal are mutually reversed.

The synchronization processing apparatus provided in this embodiment is configured to perform a technical solution on the terminal device side in any one of the foregoing method embodiments. An implementation principle and a technical effect of this embodiment are similar to those of the method embodiment, and details are not described herein again.

Figure 12:
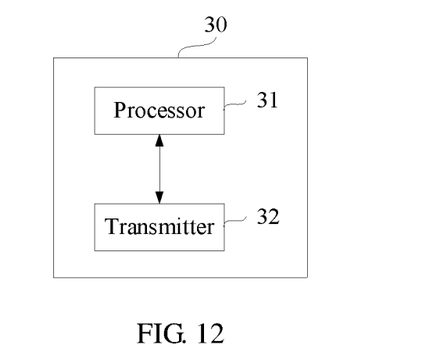
FIG. 12 is a schematic structural diagram of a network device according to Embodiment 1 of this application.

FIG. 12 is a schematic structural diagram of a network device according to Embodiment 1 of this application. As shown in FIG. 12, the network device 30 includes a processor 31, configured to generate a first synchronization signal and a second synchronization signal, and a transmitter 32, configured to: send the first synchronization signal to a terminal device in a first time unit, and send the second synchronization signal to the terminal device in a second time unit, so that the terminal device determines, based on the first synchronization signal and the second synchronization signal, an optimal transmit beam of the network device for the terminal device and a time sequence in which the optimal transmit beam is located, where a time offset corresponding to each beam is different, and the time offset is a difference between a time sequence of the beam in the first synchronization signal and a time sequence of the beam in the second synchronization signal.

The network device provided in this embodiment is configured to perform the technical solution on a network device side in any one of the foregoing method embodiments. An implementation principle and a technical effect of this embodiment are similar to those of the method embodiment, and details are not described herein again.

Based on Embodiment 1 of the network device, each beam in the first synchronization signal uses a same sequence, and each beam in the second synchronization signal uses a same sequence.

Optionally, the sequence in the first synchronization signal is the same as the sequence in the second synchronization signal.

Optionally, the sequence in the first synchronization signal is different from the sequence in the second synchronization signal.

Optionally, the sequence in the first synchronization signal and the sequence in the second synchronization signal are orthogonal to each other.

Preferably, the sequence in the first synchronization signal and the sequence in the second synchronization signal are conjugate to each other.

Optionally, an order of scanning beams in the first synchronization signal and an order of scanning beams in the second synchronization signal are mutually reversed.

Figure 13:
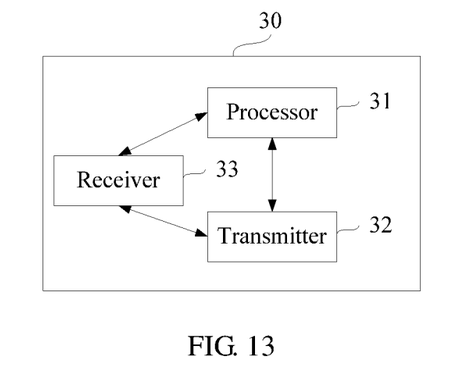
FIG. 13 is a schematic structural diagram of a network device according to Embodiment 2 of this application.

FIG. 13 is a schematic structural diagram of a network device according to Embodiment 2 of this application. As shown in FIG. 13, the network device 30 further includes a receiver 33, configured to receive a signal that is sent in the time sequence in which the optimal transmit beam is located by the terminal device.

The network device provided in this embodiment is configured to perform the technical solution on a network device side in any one of the foregoing method embodiments. An implementation principle and a technical effect of this embodiment are similar to those of the method embodiment, and details are not described herein again.

Figure 14:
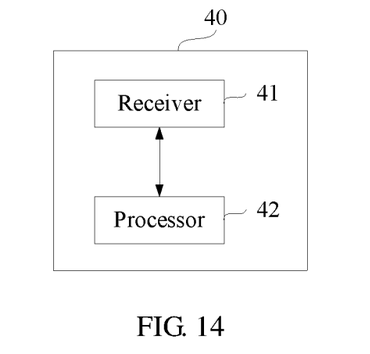
FIG. 14 is a schematic structural diagram of a terminal device according to Embodiment 1 of this application.

FIG. 14 is a schematic structural diagram of a terminal device according to Embodiment 1 of this application. As shown in FIG. 14, the terminal device 40 includes a receiver 41, configured to receive a first synchronization signal sent in a first time unit by a network device and a second synchronization signal sent in a second time unit by the network device, where a time offset corresponding to each beam is different, and the time offset is a difference between a time sequence of the beam in the first synchronization signal and a time sequence of the beam in the second synchronization signal, and a processor 42, configured to determine, based on the first synchronization signal and the second synchronization signal, an optimal transmit beam of the network device for the terminal device and a time sequence in which the optimal transmit beam is located.

The terminal device provided in this embodiment is configured to perform the technical solution on a terminal device side in any one of the foregoing method embodiments. An implementation principle and a technical effect of this embodiment are similar to those of the method embodiment, and details are not described herein again.

Based on Embodiment 1 of the terminal device, the processor 42 is specifically configured to perform correlation detection on a sequence of each beam in the first synchronization signal and a sequence of each beam in the second synchronization signal, to obtain an optimal beam having a highest correlation in the first synchronization signal and an optimal beam having a highest correlation in the second synchronization signal, and obtain, based on a time difference between the optimal beam having the highest correlation in the first synchronization signal and the optimal beam having the highest correlation in the second synchronization signal, the optimal transmit beam of the network device for the terminal device and the time sequence in which the optimal transmit beam is located.

Optionally, the processor 42 is further configured to initiate random access based on a time sequence correspondence between the optimal transmit beam and a random access channel.

Figure 15:
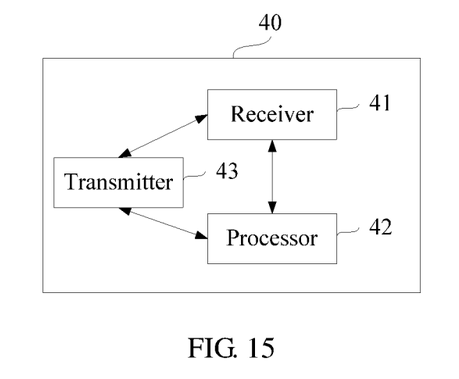
FIG. 15 is a schematic structural diagram of a terminal device according to Embodiment 2 of this application.

FIG. 15 is a schematic structural diagram of a terminal device according to Embodiment 2 of this application. As shown in FIG. 15, based on the foregoing embodiment, the terminal device 40 further includes a transmitter 43, configured to send a signal to the network device in the time sequence in which the optimal transmit beam is located.

Optionally, each beam in the first synchronization signal uses a same sequence, and each beam in the second synchronization signal uses a same sequence.

Optionally, the sequence in the first synchronization signal is the same as the sequence in the second synchronization signal.

Optionally, the sequence in the first synchronization signal is different from the sequence in the second synchronization signal.

Optionally, the sequence in the first synchronization signal and the sequence in the second synchronization signal are orthogonal to each other.

Preferably, the sequence in the first synchronization signal and the sequence in the second synchronization signal are conjugate to each other.

Optionally, an order of scanning beams in the first synchronization signal and an order of scanning beams in the second synchronization signal are mutually reversed.

The terminal device provided in this embodiment is configured to perform the technical solution on a terminal device side in any one of the foregoing method embodiments. An implementation principle and a technical effect of this embodiment are similar to those of the method embodiment, and details are not described herein again.

In specific implementation of the network device or the terminal device, a computer program and a memory may be further included. The computer program is stored in the memory, and the processor runs the computer program to perform the foregoing synchronization processing method. There is at least one processor, and the at least one processor is configured to perform an execution instruction, that is, the computer program, stored in the memory, so that the terminal device performs data exchange with the network device by using a communications interface, to perform the synchronization processing method provided in the implementations of the foregoing aspects. Optionally, the memory may be further integrated in the processor.

This application further provides a storage medium, including a readable storage medium and a computer program, where the computer program is configured to perform the synchronization processing method on a network device side.

This application further provides a storage medium, including a readable storage medium and a computer program, where the computer program is configured to perform the synchronization processing method on a terminal device side.

This application further provides a program product. The program product includes a computer program (an execution instruction), and the computer program is stored in a readable storage medium. At least one processor of a network device may read the computer program from the readable storage medium, and the at least one processor performs the computer program, so that the network device performs the synchronization processing method provided in the foregoing implementations.

This application further provides a program product. The program product includes a computer program (an execution instruction), and the computer program is stored in a readable storage medium. At least one processor of a terminal device may read the computer program from the readable storage medium, and the at least one processor performs the computer program, so that the terminal device performs the synchronization processing method provided in the foregoing implementations.

It should be understood that, in the foregoing embodiments of the network device and the terminal device, the processor may be a central processing unit (CPU), or may be another general purpose processor, a digital signal processor (DSP), an application-specific integrated circuit (ASIC), or the like. The general purpose processor may be a microprocessor, or the processor may be any conventional processor or the like. The steps of the method disclosed with reference to the embodiments of this application may be directly performed by a hardware processor, or may be performed by using a combination of hardware in the processor and a software module.

A person of ordinary skill in the art may understand that all or some of the steps of the method embodiments may be implemented by a program instructing related hardware. The program may be stored in a computer-readable memory. When the program is executed, the steps of the methods in the embodiments are performed. The memory (storage medium) includes a read-only memory (ROM), a RAM, a flash memory, a hard disk, a solid state disk, a magnetic tape, a floppy disk, an optical disc, and any combination thereof.

Finally, it should be noted that the foregoing embodiments are merely intended for describing the technical solutions of this application, rather than limiting this application.

What is claimed is:

1. A synchronization processing method, comprising:
sending, in a first time unit, by a network device, a first synchronization signal having one or more first beams to a terminal device; and
sending, in a second time unit, a second synchronization signal having one or more second beams to the terminal device, wherein the first synchronization signal and the second synchronization signal cause the terminal device to determine, according to the first synchronization signal and the second synchronization signal, an optimal transmit beam of the network device for the terminal device from the one or more first beams and the one or more second beams, and further to determine a time sequence in which the optimal transmit beam is located;

wherein a time offset corresponding to each of the one or more first beams and of the one or more second beams is different, and wherein the time offset is a difference between a time sequence of the one or more first beams in the first synchronization signal and a time sequence of the one or more second beams in the second synchronization signal.

2. The method according to claim 1, wherein each of the one or more first beams in the first synchronization signal uses a same first sequence, and wherein each of the one or more second beams in the second synchronization signal uses a same second sequence.

3. The method according to claim 2, wherein the first sequence in the first synchronization signal and the second sequence in the second synchronization signal are orthogonal to each other.

4. The method according to claim 2, wherein the first sequence in the first synchronization signal and the second sequence in the second synchronization signal are conjugates of each other.

5. The method according to claim 1, wherein a first order of scanning beams in the first synchronization signal and a second order of scanning beams in the second synchronization signal are mutually reversed.

6. The method according to claim 1, wherein a first sequence in the first synchronization signal is the same as, or different from, a second sequence in the second synchronization signal.

7. A synchronization processing method, comprising:
receiving, by a terminal device, a first synchronization signal having one or more first beams and sent in a first time unit by a network device;
receiving a second synchronization signal having one or more second beams sent in a second time unit by the network device, wherein a time offset corresponding to each of the one or more first beams and of the one or more second beams is different, and wherein the time offset is a difference between a time sequence of the one or more first beams in the first synchronization signal and a time sequence of the one or more second beams in the second synchronization signal; and
determining, by the terminal device according to the first synchronization signal and the second synchronization signal, an optimal transmit beam of the network device for the terminal device and a time sequence in which the optimal transmit beam is located.

8. The method according to claim 7, wherein the determining the optimal transmit beam of the network device for the terminal device and a time sequence in which the optimal transmit beam is located comprises:
performing, by the terminal device, correlation detection on a sequence of each of the one or more first beams in the first synchronization signal and a sequence of each of the one or more second beams in the second synchronization signal;
obtaining, according to the correlation detection, a first optimal beam having a highest correlation in the first synchronization signal and a second optimal beam having a highest correlation in the second synchronization signal; and
obtaining, by the terminal device according to a time difference between the first optimal beam and the second optimal beam, the optimal transmit beam of the network device for the terminal device and the time sequence in which the optimal transmit beam is located.

9. The method according to claim 7, wherein the method further comprises:
initiating, by the terminal device, random access based on a time sequence correspondence between the optimal transmit beam and a random access channel.

10. The method according to claim 7, wherein the method further comprises:
sending, by the terminal device, a signal to the network device in the time sequence in which the optimal transmit beam is located.

11. The method according to claim 7, wherein each of the one or more first beams in the first synchronization signal uses a same first sequence, and wherein each of the one or more second beams in the second synchronization signal uses a same second sequence.

12. The method according to claim 11, wherein the first sequence in the first synchronization signal and the second sequence in the second synchronization signal are orthogonal to each other.

13. The method according to claim 11, wherein the sequence in the first synchronization signal and the sequence in the second synchronization signal are conjugate to each other.

14. The method according to claim 7, wherein an order of scanning beams in the first synchronization signal and an order of scanning beams in the second synchronization signal are mutually reversed.

15. A network device, comprising:
a transmitter;
a processor; and
a non-transitory computer-readable storage medium storing a program to be executed by the processor, the program including instructions to:
generate a first synchronization signal and a second synchronization signal;
cause the transmitter to send, in a first time unit, a first synchronization signal having one or more first beams to a terminal device; and
cause the transmitter to send, in a second time unit, a second synchronization signal having one or more second beams to the terminal device, wherein the first synchronization signal and the second synchronization signal cause the terminal device to determine, according to the first synchronization signal and the second synchronization signal, an optimal transmit beam of the network device for the terminal device from the one or more first beams and the one or more second beams, and further to determine a time sequence in which the optimal transmit beam is located;
wherein a time offset corresponding to each of the one or more first beams and of the one or more second beams is different, and wherein the time offset is a difference between a time sequence of the one or more first beams in the first synchronization signal and a time sequence of the one or more second beams in the second synchronization signal.

16. The network device according to claim 15, wherein each of the one or more first beams in the first synchronization signal uses a same first sequence, and wherein each of the one or more second beams in the second synchronization signal uses a same second sequence.

17. A terminal device, comprising:
a receiver;
a processor; and
a non-transitory computer-readable storage medium storing a program to be executed by the processor, the program including instructions to:
receive, through the receiver, a first synchronization signal having one or more first beams and sent in a first time unit by a network device;
receive, through the receiver, a second synchronization signal having one or more second beams sent in a second time unit by the network device, wherein a time offset corresponding to each of the one or more first beams and of the one or more second beams is different, and wherein the time offset is a difference between a time sequence of the one or more first beams in the first synchronization signal and a time sequence of the one or more second beams in the second synchronization signal; and
determine, according to the first synchronization signal and the second synchronization signal, an optimal transmit beam of the network device for the terminal device and a time sequence in which the optimal transmit beam is located.

18. The terminal device according to claim 17, wherein the instructions to determine the optimal transmit beam include instructions to:
perform correlation detection on a sequence of each of the one or more first beams in the first synchronization signal and a sequence of each of the one or more second beams in the second synchronization signal;
obtain, according to the correlation detection, a first optimal beam having a highest correlation in the first synchronization signal and a second optimal beam having a highest correlation in the second synchronization signal; and
obtaining, according to a time difference between the first optimal beam and the second optimal beam, the optimal transmit beam of the network device for the terminal device and the time sequence in which the optimal transmit beam is located.

19. The terminal device according to claim 17, wherein the program further includes instructions to initiate random access based on a time sequence correspondence between the optimal transmit beam and a random access channel.

20. The terminal device according to claim 17, wherein the terminal device further comprises:
a transmitter, configured to send a signal to the network device in the time sequence in which the optimal transmit beam is located.

* * * * *